(12) United States Patent
Hu et al.

(10) Patent No.: US 11,695,305 B2
(45) Date of Patent: Jul. 4, 2023

(54) ROTOR STRUCTURE, PERMANENT MAGNET AUXILIARY SYNCHRONOUS RELUCTANCE MOTOR, AND ELECTRIC VEHICLE

(71) Applicant: GREE ELECTRIC APPLIANCES, INC. OF ZHUHAI, Guangdong (CN)

(72) Inventors: Yusheng Hu, Zhuhai (CN); Bin Chen, Zhuhai (CN); Yong Xiao, Zhuhai (CN); Tong Tong, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 257 days.

(21) Appl. No.: 17/048,069

(22) PCT Filed: Dec. 7, 2018

(86) PCT No.: PCT/CN2018/119794
§ 371 (c)(1),
(2) Date: Oct. 15, 2020

(87) PCT Pub. No.: WO2019/214222
PCT Pub. Date: Nov. 14, 2019

(65) Prior Publication Data
US 2021/0167644 A1  Jun. 3, 2021

(30) Foreign Application Priority Data

May 8, 2018 (CN) .......................... 201810433340.1

(51) Int. Cl.
*H02K 1/27* (2022.01)
*H02K 1/276* (2022.01)
(Continued)

(52) U.S. Cl.
CPC .............. *H02K 1/276* (2013.01); *B60L 50/00* (2019.02); *H02K 29/03* (2013.01)

(58) Field of Classification Search
CPC ...... H02K 1/276; H02K 29/03; H02K 1/2766; H02K 2213/03; B60L 50/00; B60L 2220/12; B60L 2220/50; Y02T 10/64
See application file for complete search history.

(56) References Cited

U.S. PATENT DOCUMENTS

2016/0344274 A1\*  11/2016  Jurkovic .............. H02K 1/2766
2020/0021153 A1\*  1/2020  Saito .................... H02K 1/2766

FOREIGN PATENT DOCUMENTS

CN          104600890 A  \*  5/2015

\* cited by examiner

*Primary Examiner* — Thomas Truong
(74) *Attorney, Agent, or Firm* — J. Miguel Hernandez; James R. Gourley; Carstens, Allen & Gourley, LLP (57) ABSTRACT

Rotor structure, permanent magnet auxiliary synchronous reluctance motor and electric vehicle. The rotor structure includes: a rotor body provided with a permanent magnet slot group, the permanent magnet slot group including a permanent magnet slot, a first segment and a second segment of the permanent magnet slot being arranged to extend towards an outer edge of the rotor body, and an intermediate portion of the permanent magnet slot being arranged to protrude towards a side where a shaft hole of the rotor body is disposed; and a permanent magnet arranged in the permanent magnet slot, the permanent magnet including a plurality of permanent magnet segments, and partial lengths of the permanent magnet segments gradually decreasing outwards along a radial direction of the rotor body.

17 Claims, 3 Drawing Sheets

(51) Int. Cl.
*B60L 50/00* (2019.01)
*H02K 29/03* (2006.01)

ROTOR STRUCTURE, PERMANENT MAGNET AUXILIARY SYNCHRONOUS RELUCTANCE MOTOR, AND ELECTRIC VEHICLE

CROSS REFERENCE TO RELATED APPLICATION

This application claims all benefits accruing under 35 U.S.C. § 119 from China Patent Application No. 201810433340.1, filed on May 8, 2018 in the China National Intellectual Property Administration. This application is a national phase under 35 U.S.C. § 120 of international patent application PCT/CN2018/119794, entitled "ROTOR STRUCTURE, PERMANENT MAGNET AUXILIARY SYNCHRONOUS RELUCTANCE MOTOR AND ELECTRIC VEHICLE" filed on Dec. 7, 2018, published as WO 2019/214222 on Nov. 14, 2019. The contents of every patent application and publication listed in this paragraph is hereby incorporated herein by reference.

TECHNICAL FIELD

The present disclosure relates to the technical field of motor device, and particularly to a rotor structure, a permanent magnet auxiliary synchronous reluctance motor and an electric vehicle.

BACKGROUND

Electric vehicles have the characteristics of energy saving and environmental friendship, and have developed rapidly. In order to achieve functions of high power density and high efficiency of motors, more and more existing driving motors of electric vehicles use high-performance rare earth permanent magnet motors. Mainly relying on a high-performance rare earth permanent magnet, the rare earth permanent magnet motor can achieve high efficiency and high power density, and currently, the most widely used rare earth permanent magnets are neodymium iron boron rare earth permanent magnets. However, rare earth is a non-renewable resource, and the price of rare earth is relatively expensive and fluctuates greatly, resulting in higher production costs of the drive motor of the electric vehicle, which is terribly unfavorable for promoting the comprehensive development of the electric vehicle. Further, in the prior art, ferrite permanent magnet auxiliary synchronous reluctance motors are also applied to electric vehicles, but such motors have problems of high noise, being easily demagnetized, and low efficiency.

SUMMARY

The main objective of the present disclosure is to provide a rotor structure, a permanent magnet auxiliary synchronous reluctance motor and an electric vehicle to solve a problem of low efficiency of the motor in the prior art.

In order to achieve the above objective, according to one aspect of the present disclosure, a rotor structure is provided. The rotor structure includes: a rotor body provided with a permanent magnet slot group, the permanent magnet slot group including a permanent magnet slot, a first segment and a second segment of the permanent magnet slot being arranged to extend towards an outer edge of the rotor body, and an intermediate portion of the permanent magnet slot being arranged to protrude towards a side where a shaft hole of the rotor body is disposed; and a permanent magnet arranged in the permanent magnet slot, the permanent magnet including a plurality of permanent magnet segments, and partial lengths of the permanent magnet segments gradually decreasing outwards along a radial direction of the rotor body.

Further, the permanent magnet slot includes an inner layer permanent magnet slot and an outer layer permanent magnet slot; the inner layer permanent magnet slot and the outer layer permanent magnet slot are arranged and spaced outwards along the radial direction of the rotor body; the permanent magnet includes an inner layer permanent magnet and an outer layer permanent magnet; the inner layer permanent magnet is arranged in the inner layer permanent magnet slot; the outer layer permanent magnet is arranged in the outer layer permanent magnet slot; and the inner layer permanent magnet and the outer layer permanent magnet each include a plurality of permanent magnet segments.

Further, the plurality of the permanent magnet segments include a first outer component segment, a second outer component segment and a third outer component segment; and the first outer component segment, the second outer component segment and the third outer component segment are arranged outwards along the radial direction of the rotor body in sequence and arranged in a first segment of the outer layer permanent magnet slot, and disposed at a first side of a direct-axis of the rotor body; a length of the third outer component segment in the radial direction of the rotor body is L1; a length of the second outer component segment in the radial direction of the rotor body is L2; a length of the first outer component segment in the radial direction of the rotor body is L3; and L3>L2>L1.

Further, L3>1.2×L2, and L2>1.2×L1.

Further, the plurality of the permanent magnet segments further includes a fourth outer component segment, a fifth outer component segment and a sixth outer component segment; the fourth outer component segment, the fifth outer component segment and the sixth outer component segment are arranged outwards along the radial direction of the rotor body in sequence and arranged in a second segment of the outer layer permanent magnet slot, and disposed at a second side opposite to the first side of the direct-axis of the rotor body; a length of the sixth outer component segment in the radial direction of the rotor body is L4; a length of the fifth outer component segment in the radial direction of the rotor body is L5; a length of the fourth outer component segment in the radial direction of the rotor body is L6; and L6>L5>L4.

Further, L6>1.2×L5, and L5>1.2×L4.

Further, the plurality of the permanent magnet segments arranged in the inner layer permanent magnet slot includes a curved permanent magnet segment; the curved permanent magnet segment is arranged in an intermediate portion of the inner layer permanent magnet slot; and a curved portion of the curved permanent magnet segment is arranged to protrude towards the side where the shaft hole side is disposed; the plurality of the permanent magnet segments further includes a plurality of first inner permanent magnet component segments arranged in a slot arranged between a first end of the curved permanent magnet segment and a first end of the inner layer permanent magnet slot; the plurality of the permanent magnet segments further include a plurality of second inner permanent magnet component segments disposed in a slot arranged between a second end of the curved permanent magnet segment and a second end of the inner layer permanent magnet slot; and a number of the plurality of the first inner permanent magnet component segments is greater than a number of the permanent magnet segments arranged in the first segment of the outer layer permanent magnet slot, and/or, a number of the plurality of the second inner permanent magnet component segments is greater than a number of the permanent magnet segments arranged in the second segment of the outer layer permanent magnet slot.

Further, a first magnetic barrier bridge is disposed between the first end of the curved permanent magnet segment and an adjacent first inner permanent magnet component segment thereof, and/or, a second magnetic barrier bridge is disposed between the second end of the curved permanent magnet segment and an adjacent second inner permanent magnet component segment thereof.

Further, a buffer structure is arranged between two adjacent permanent magnet segments, and/or, a buffer structure is arranged between the permanent magnet segments and a slot wall of the permanent magnet slot.

Further, the buffer structure is rubber, a resin, or a spring.

Further, a first clamping point is arranged on a first slot wall of the permanent magnet slot and configured to separate two adjacent permanent magnet segments; a second clamping point is arranged on a second slot wall of the permanent magnet slot opposite to the first slot wall and configured to separate two adjacent permanent magnet segments; and the first clamping point and the second clamping point are arranged in a staggered manner.

Further, a straight line connecting the first clamping point with the second clamping point is located in a diagonal of a permanent magnet segment.

Further, the plurality of the permanent magnet segments include a first outer component segment, a second outer component segment, a third outer component segment, a fourth outer component segment, a fifth outer component segment and a sixth outer component segment; lengths of the first outer component segment, the second outer component segment and the third outer component segment along the radial direction of the rotor body decrease sequentially, and/or, lengths of the fourth outer component segment, the fifth outer component segment and the sixth outer component segment along the radial direction of the rotor body decrease sequentially.

Further, lengths of the plurality of first inner permanent magnet component segments along the radial direction of the rotor body decrease outwards, and lengths of the plurality of the second inner permanent magnet component segments along the radial direction of the rotor body decrease outwards.

Further, the permanent magnet slot further includes an intermediate layer permanent magnet slot, and the intermediate layer permanent magnet slot is arranged between the inner layer permanent magnet slot and the outer layer permanent magnet slot.

According to another aspect of the present disclosure, a permanent magnet auxiliary synchronous reluctance motor is provided, including the rotor structure mentioned above.

According to another aspect of the present disclosure, an electric vehicle is provided, including the rotor structure mentioned above.

By applying technical solutions of the present disclosure, partial lengths of the permanent magnet segments are arranged to gradually decrease outwards along the radial direction of the rotor body, thereby effectively reducing eddy current loss of the permanent magnets of the rotor structure, increasing the quadrature-axis inductance of the rotor structure, decreasing torque ripple of the rotor structure, reducing the vibration and noises of a motor provided with the structure, increasing the efficiency of the motor, and effectively improving the anti-demagnetization capability of the motor.

BRIEF DESCRIPTION OF THE DRAWINGS

The accompanying drawings, which form a part of the present disclosure, are used to provide a further understanding of the present disclosure. The illustrative embodiments of the present disclosure and the descriptions thereof are used to explain the present disclosure, and do not constitute an improper limitation on the present disclosure. In the accompany drawings.

DETAILED DESCRIPTION OF THE EMBODIMENTS

It should be noted that the embodiments in the present disclosure and the features in the embodiments can be combined with each other if no conflicts occur. The disclosure will be described in detail below with reference to the accompanying drawings in combination with the embodiments.

It should be noted that terms used herein are only for the purpose of describing specific embodiments and not intended to limit the exemplary embodiments of the disclosure. The singular of a term used herein is intended to include the plural of the term unless the context otherwise specifies. In addition, it should also be appreciated that when terms "include" and/or "comprise" are used in the description, they indicate the presence of features, steps, operations, devices, components and/or their combination.

It should be noted that the terms "first", "second", and the like in the description, claims and drawings of the present disclosure are used to distinguish similar objects, and are not necessarily used to describe a specific order or order. It should be appreciated that such terms can be interchangeable if appropriate, so that the embodiments of the disclosure described herein can be implemented, for example, in an order other than those illustrated or described herein. In addition, the terms "comprise", "have" and any deformations thereof, are intended to cover a non-exclusive inclusion, for example, a process, a method, a system, a product, or a device that includes a series of steps or units is not necessarily limited to explicitly list those steps or units, but can include other steps or units that are not explicitly listed or inherent to such a process, a method, a product or a device.

For convenience of description, spatially relative terms such as "above", "over", "on a surface of", "upper", etc., may be used herein to describe the spatial position relationships between one device or feature and other devices or features as shown in the drawings. It should be appreciated that the spatially relative term is intended to include different directions during using or operating the device other than the directions described in the drawings. For example, if the device in the drawings is inverted, the device is described as the device "above other devices or structures" or "on other devices or structures" will be positioned "below other devices or structures" or "under other devices or structures". Thus, the exemplary term "above" can include both "above" and "under". The device can also be positioned in other different ways (rotating 90 degrees or at other orientations), and the corresponding description of the space used herein is interpreted accordingly.

Now, the exemplary embodiments of the disclosure will be further described in detail with reference to the accompanying drawings. However, these exemplary embodiments can be implemented in many different forms and should not be construed as only limitation of the embodiments described herein. It should be appreciated that the embodiments are provided to make the present application disclosed thoroughly and completely, and to fully convey the concepts of the exemplary embodiments to those skilled in the art. In the accompanying drawings, for the sake of clarity, the thicknesses of layers and regions may be enlarged, and a same reference sign is used to indicate a same device, thus the description thereof will be omitted.

Figure 1:
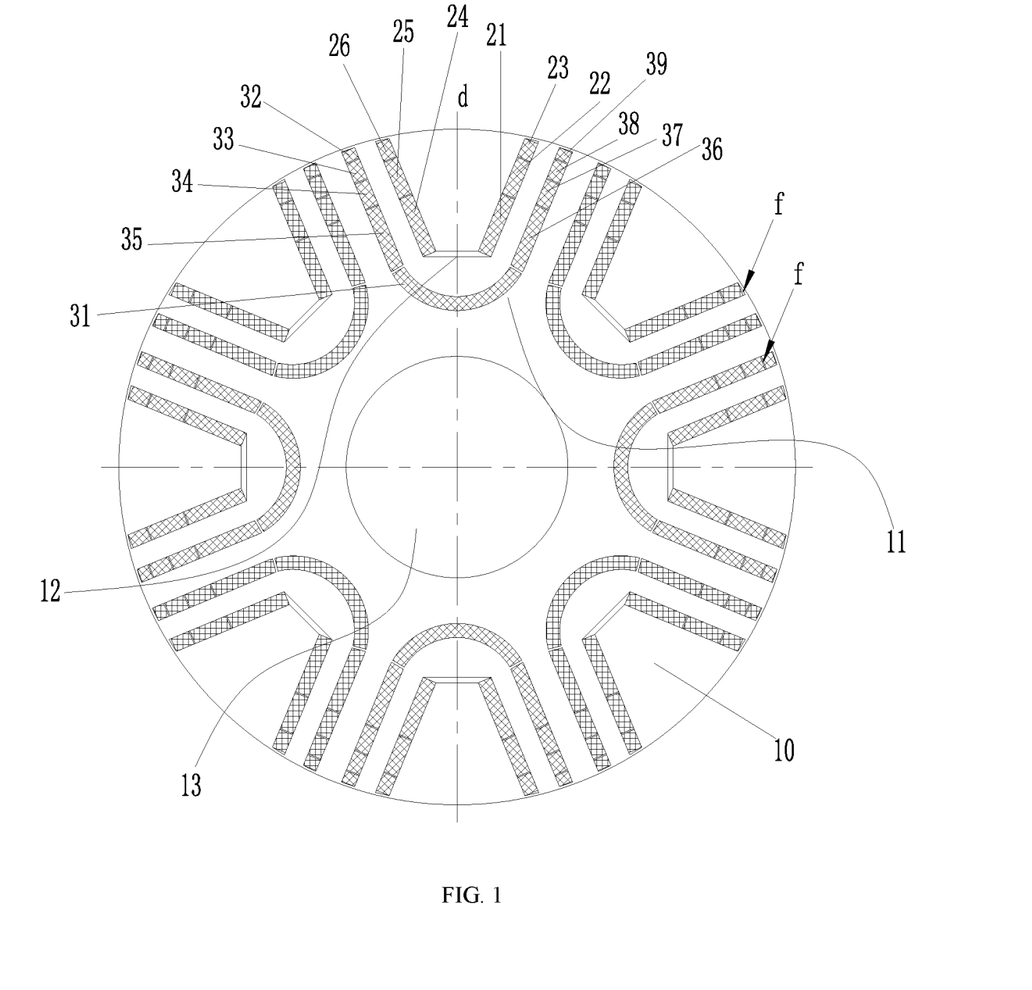
FIG. 1 shows a schematic structural view of a first embodiment of a rotor structure according to the present disclosure.
Figure 2:
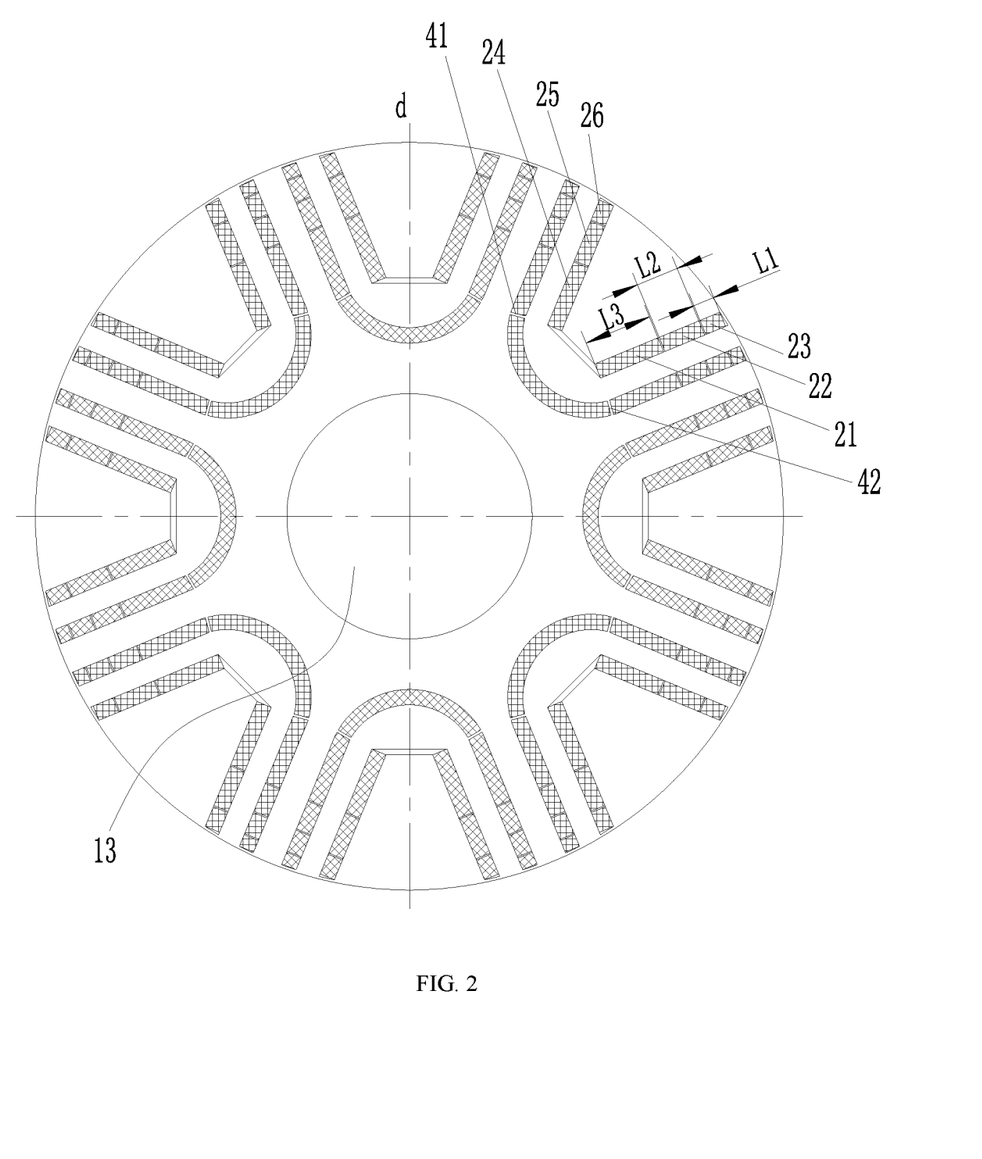
FIG. 2 shows a schematic structural view of a second embodiment of the rotor structure according to the present disclosure.
Figure 3:
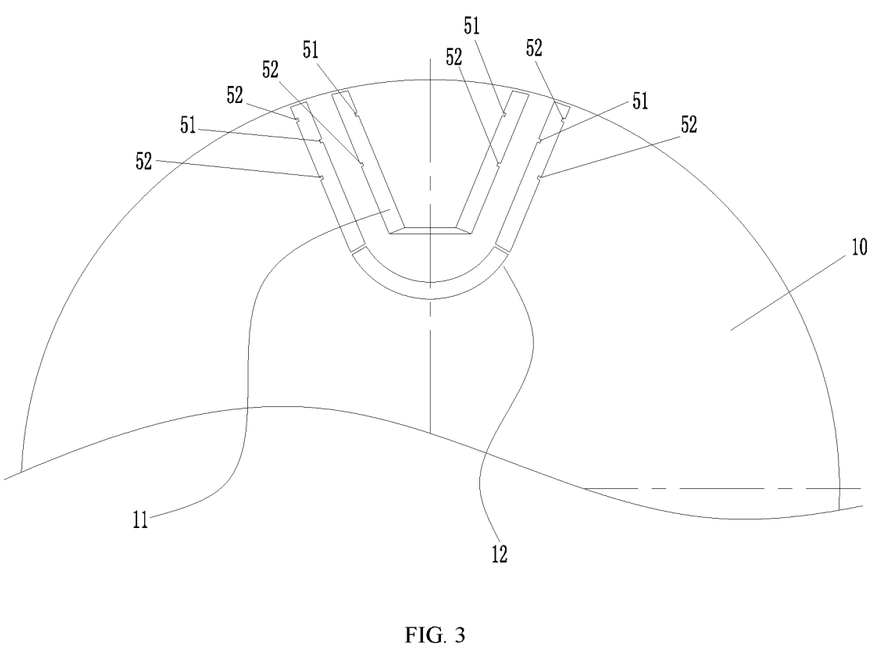
FIG. 3 shows a schematic structural view of a third embodiment of the rotor structure according to the present disclosure.

As shown in FIGS. 1 to 3, according to some embodiments of the present disclosure, a rotor structure is provided.

Specifically, as shown in FIG. 1, the rotor structure includes a rotor body 10 and a permanent magnet. The rotor body 10 is provided with a permanent magnetic slot group, and the permanent magnetic slot group includes a permanent magnet slot. A first segment and a second segment of the permanent magnet slot are arranged to extend towards an outer edge of the rotor body 10, and an intermediate portion of the permanent magnet slot is arranged to protrude towards a side where a shaft hole 13 of the rotor body 10 is disposed. The permanent magnet is arranged in the permanent magnet slot. The permanent magnet includes a plurality of permanent magnet segments, and partial lengths of the permanent magnet segments gradually decrease outwards along a radial direction of the rotor body 10.

In the embodiment, partial the lengths of the permanent magnet segments are arranged to gradually decrease outwards along the radial direction of the rotor body 10, thereby effectively reducing eddy current loss of the permanent magnets of the rotor structure, increasing the quadrature-axis inductance of the rotor structure, decreasing torque ripple of the rotor structure, reducing the vibration and noises of a motor provided with the structure, increasing the efficiency of the motor, and effectively improving the anti-demagnetization capability of the motor.

The permanent magnet slot includes an inner layer permanent magnet slot 11 and an outer layer permanent magnet slot 12. The inner layer permanent magnet slot 11 and the outer layer permanent magnet slot 12 are arranged and spaced outwards along the radial direction of the rotor body 10. The permanent magnet includes the inner layer permanent magnet and the outer layer permanent magnet; the inner layer permanent magnet is arranged in the inner layer permanent magnet slot 11; the outer layer permanent magnet is arranged in the outer layer permanent magnet slot 12; and the inner layer permanent magnet and the outer layer permanent magnet both include a plurality of permanent magnet segments.

Further, as shown in FIGS. 1 and 2, the plurality of the permanent magnet segments include a first outer component segment 21, a second outer component segment 22 and a third outer component segment 23; and the first outer component segment 21, the second outer component segment 22 and the third outer component segment 23 are arranged outwards along the radial direction of the rotor body 10 in sequence and arranged in the first segment of the outer layer permanent magnet slot, and disposed at a first side of a direct-axis of the rotor body 10. A length of the third outer component segment 23 in the radial direction of the rotor body 10 is L1; a length of the second outer component segment 22 in the radial direction of the rotor body 10 is L2; and a length of the first outer component segment 21 in the radial direction of the rotor body 10 is L3, where L3>L2>L1. Preferably, L3>1.2×L2, and L2>1.2×L1. Such an arrangement can reduce the eddy current loss inside the permanent magnet and improve the efficiency of the motor provided with the rotor structure.

The plurality of the permanent magnet segments further include a fourth outer component segment 24, a fifth outer component segment 25 and a sixth outer component segment 26; and the fourth outer component segment 24, the fifth outer component segment 25 and the sixth outer component segment 26 are arranged outwards along the radial direction of the rotor body 10 in sequence in a second end of the outer layer permanent magnet slot 12, and disposed at a second side opposite to the first side of the direct axis of the rotor body 10. A length of the sixth outer component segment 26 in the radial direction of the rotor body 10 is L4; a length of the fifth outer component segment 25 in the radial direction of the rotor body 10 is L5; and a length of the fourth outer component segment 24 in the radial direction of the rotor body 10 is L6, where L6>L5>L4. Preferably, L6>1.2×L5, and L5>1.2×L4. Such an arrangement can further reduce the eddy current loss inside the permanent magnet.

The plurality of permanent magnet segments arranged in the inner layer permanent magnet slot 11 includes a curved permanent magnet segment 31. The curved permanent magnet segments 31 is arranged in an intermediate portion of the inner layer permanent magnet slot 11, and a curved portion of the curved permanent magnet segment is arranged to protrude towards the side where the shaft hole is disposed. The plurality of the permanent magnet segments further include a plurality of first inner permanent magnet component segments arranged in a slot arranged between a first end of the curved permanent magnet segment and a first end of the inner layer permanent magnet slot; the plurality of the permanent magnet segments further include a plurality of second inner permanent magnet component segments disposed in a slot arranged between a second end of the curved permanent magnet segment and a second end of the inner layer permanent magnet slot; and the number of the plurality of the first inner permanent magnet component segments is greater than the number of the permanent magnet segments arranged in the first segment of the outer layer permanent magnet slot, and/or, the number of the plurality of the second inner permanent magnet component segments is greater than the number of the permanent magnet segments arranged in the second segment of the outer layer permanent magnet slot. As shown in FIG. 1, the plurality of the first inner permanent magnet component segments include a permanent magnet segment 32, a permanent magnet segment 33, a permanent magnet segment 34, and a permanent magnet segment 35; and the plurality of the second inner permanent magnet component segments include a permanent magnet segment 36, a permanent magnet segment 37, a permanent magnet segment 38, and a permanent magnet segment 39. That is, in the present embodiment, the number of the inner layer permanent magnet component segments of the rotor is greater than the number of the outer layer permanent magnet component segments, which further reduces the eddy current loss inside the permanent magnets.

As shown in FIG. 2, a first magnetic barrier bridge 41 is disposed between the first end of the curved permanent magnet segment 31 and an adjacent first inner permanent magnet component segment thereof, and/or, a second magnetic barrier bridge 42 is disposed between the second end of the curved permanent magnet segment 31 and an adjacent second inner permanent magnet component segment thereof. As shown at "f" in FIG. 1, a buffer structure is arranged between two adjacent permanent magnet segments, and/or, a buffer structure is arranged between the permanent magnet segments and a slot wall of the permanent magnet slot. Where the buffer structure is made of rubber, or is a resin or a spring. The buffer structure with buffer function is configured to fix the permanent magnet, so as to prevent vibration and deviation of the permanent magnet caused by a centrifugal force and vibrations during a rotation of the rotor when the motor is working. Such a structure effectively improves the stability of fixing the permanent magnet.

As shown in FIG. 3, a first clamping point 51 is arranged on a first slot wall of the permanent magnet slot, and configured to separate two adjacent permanent magnet segments; a second clamping point 52 is arranged on a second slot wall of the permanent magnet slot opposite to the first slot wall and configured to separate two adjacent permanent magnet segments; and the first clamping point 51 and the second clamping point 52 are arranged in a staggered manner. Such an arrangement can effectively improve the stability of the permanent magnet. A straight line connecting the first clamping point 51 with an adjacent second clamping point 52 is located in a diagonal of a permanent magnet segment.

According to another embodiment of the present disclosure, the plurality of the permanent magnet segments include the first outer component segment 21, the second outer component segment 22, the third outer component segment 23, the fourth outer component segment 24, the fifth outer component segment 25 and the sixth outer component segment 26. Where, lengths of the first outer component segment 21, the second outer component segment 22 and the third outer component segment 23 along the radial direction of the rotor body 10 decrease sequentially; lengths of the fourth outer component segment 24, the fifth outer component segment 25 and the sixth outer component segment 26 along the radial direction of the rotor body 10 decrease sequentially; and lengths of the plurality of first inner permanent magnet component segments along the radial direction of the rotor body 10 decrease outwards and/or lengths of the plurality of the second inner permanent magnet component segments along the radial direction of the rotor body 10 decrease outwards.

The permanent magnet slot further includes an intermediate layer permanent magnet slot, and the intermediate layer permanent magnet slot is arranged between the inner layer permanent magnet slot 11 and the outer layer permanent magnet slot 12. Such an arrangement can facilitate replacement of the permanent magnet, and further improves the anti-demagnetization performance of the rotor structure.

The rotor structure in the above embodiments can also be used in a technical field of motor, that is, according to another aspect of the present disclosure, a permanent magnet auxiliary synchronous reluctance motor (a motor for short) is provided. The motor includes any one of the rotor structures of the above embodiments.

The rotor structure in the above embodiments can also be used in a technical field of electric vehicle, that is, according to another aspect of the present disclosure, an electric vehicle is provided, and the electric vehicle includes any one of the rotor structures of the above embodiments.

Specifically, the motor includes a stator and a rotor. The stator includes a stator core and windings thereof embedded in the stator core. The rotor includes slots configured to receive permanent magnets and the permanent magnets placed in the slots. A same magnetic pole of the rotor includes multiple layers of permanent magnets, which enables the motor to obtain a larger reluctance torque and to have a comparatively strong anti-demagnetization ability. The permanent magnets in the same magnetic pole have the same polarity toward the stator. The permanent magnet slot is in a convex shape toward inside of the rotor. Two ends of the permanent magnet slot are adjacent to an outer circle of the rotor. As shown in FIG. 1, the permanent magnet arranged in both side arms of each magnetic pole of the motor rotor include a plurality of segments, and the closer the permanent magnet segment is to the outer edge of the rotor, the smaller the length of the permanent magnet along the radial direction of the rotor. As shown in FIGS. 1 and 2, the outer layer permanent magnet includes three segments, and the lengths of the permanent magnet segments from the outer side towards the inner side of the rotor are L1, L2 and L3, respectively, where L3>L2>L1.

The study found that an alternating frequency of the magnetic field in the permanent magnet of the rotor of the permanent magnet auxiliary synchronous reluctance motor is larger than that of the conventional permanent magnet synchronous motor, and high order harmonics of high content exist in the permanent magnet, thus easily causing larger eddy current loss in the permanent magnet, increasing the loss of the motor and lowering the operating point of the permanent magnet. In an extreme case, the permanent magnet will be irreversibly demagnetized due to excessive temperature. The closer the permanent magnet is to the outer surface of the rotor, the higher the content of the high harmonic magnetic field is, and the greater the generated eddy current loss is. By designing the length of the permanent magnet segment arranged at a position, where the eddy current loss is large, in the radial direction of the rotor body to be shorter, and designing the permanent magnet segment at a position, where the eddy current loss is small, to be longer, the number of the permanent magnet segments can be significantly reduced on the premise of reducing the eddy current loss of the permanent magnet, and a manufacturability of the motor is improved.

In addition to the above description, it also should be noted that "one embodiment", "another embodiment", "an embodiment" and the like in the description refer to that a specific feature, a structure or a characteristic described in combination with the embodiment is included in at least one embodiment of the general description of the present disclosure. The same expression in various locations in the specification does not necessarily refer to the same embodiment. Furthermore, when a specific feature, a structure, or a characteristic are described in combination with any embodiments, what is claimed is that other embodiments which are combined to implement such a feature, a structure, or a characteristic are also included in the scope of the present disclosure.

In the above embodiments, the descriptions of the various embodiments have different emphases, and any portions that are not detailed in a certain embodiment can be seen in the related descriptions of other embodiments.

The above descriptions are merely the preferred embodiments of the present disclosure, and are not intended to limit the present disclosure. For those skilled in the art, various modifications and changes can be made for the present disclosure. Any modifications, equivalent substitutions, improvements, etc., made within the spirits and the principles of the present disclosure are included within the scope of the present disclosure.

What is claimed is:

1. A rotor structure, comprising:
a rotor body provided with a permanent magnet slot group, the permanent magnet slot group comprising a permanent magnet slot, a first segment and a second segment of the permanent magnet slot being arranged to extend towards an outer edge of the rotor body, and an intermediate portion of the permanent magnet slot being arranged to protrude towards a side where a shaft hole of the rotor body is disposed;
a permanent magnet arranged in the permanent magnet slot, the permanent magnet comprising a plurality of permanent magnet segments, and partial lengths of the permanent magnet segments gradually decreasing outwards along a radial direction of the rotor body;
the permanent magnet slot comprises an inner layer permanent magnet slot and an outer layer permanent magnet slot; the inner layer permanent magnet slot and the outer layer permanent magnet slot are arranged and spaced outwards along the radial directions of the rotor body; the permanent magnet comprises an inner layer permanent magnet and an outer later permanent magnet; the inner layer permanent magnet is arranged in the inner layer permanent magnet slot; the outer layer permanent magnet is arranged in the outer layer permanent magnet slot; and the inner layer permanent magnet and the outer layer permanent magnet each comprise a plurality of permanent magnet segments;
The plurality of the permanent magnet segments comprise a first outer component segment, a second outer component segment and a third outer component segment; and the first outer component segment, the second outer component segment and the third outer component segment are arranged outwards along the radial direction of the rotor body in sequence and arranged in a first segment of the outer layer permanent magnet slot, and disposed at a first side of a direct-axis of the rotor body; a length of the third outer component segment in the radial direction of the rotor body is L1; length of a second outer component segment in the radial direction of the rotor body is L2; a length of the first outer component segment in the radial direction of the rotor body is L3; and L3>L2>L1.

2. The rotor structure according to claim 1, wherein L3>1.2×L2, and L2>1.2×L1.

3. The rotor structure according to claim 1, wherein the plurality of the permanent magnet segments further comprises a fourth outer component segment, a fifth outer component segment and a sixth outer component segment; the fourth outer component segment, the fifth outer component segment and the sixth outer component segment are arranged outwards along the radial direction of the rotor body in sequence and arranged in a second segment of the outer layer permanent magnet slot, and disposed at a second side opposite to the first side of the direct-axis of the rotor body; a length of the sixth outer component segment in the radial direction of the rotor body is L4; a length of the fifth outer component segment in the radial direction of the rotor body is L5; a length of the fourth outer component segment in the radial direction of the rotor body is L6; and L6>L5>L4.

4. The rotor structure according to claim 3, wherein L6>1.2×L5, and L5>1.2×L4.

5. The rotor structure according to claim 1, wherein a buffer structure is arranged between two adjacent permanent magnet segments, and a buffer structure is arranged between the permanent magnet segments and a slot wall of the permanent magnet slot.

6. The rotor structure according to claim 5, wherein the buffer structure is rubber, a resin, or a spring.

7. The rotor structure according to claim 1, wherein a first clamping point is arranged on a first slot wall of the permanent magnet slot and configured to separate two adjacent permanent magnet segments; a second clamping point is arranged on a second slot wall of the permanent magnet slot opposite to the first slot wall and configured to separate two adjacent permanent magnet segments; and the first clamping point and the second clamping point are arranged in a staggered manner.

8. The rotor structure according to claim 7, wherein a straight line connecting the first clamping point with the second clamping point is located in a diagonal of a permanent magnet segment.

9. A permanent magnet auxiliary synchronous reluctance motor, comprising a rotor structure, wherein the rotor structure is the rotor structure according to claim 1.

10. An electric vehicle, comprising a rotor structure, wherein the rotor structure is the rotor structure according to claim 1.

11. The rotor structure according to claim 1, wherein a buffer structure is arranged between two adjacent permanent magnet segments, or a buffer structure is arranged between the permanent magnet segments and a slot wall of the permanent magnet slot.

12. A rotor structure, comprising:
a rotor body provided with a permanent magnet slot group, the permanent magnet slot group comprising a permanent magnet slot, a first segment and a second segment of the permanent magnet slot being arranged to extend towards an outer edge of the rotor body, and an intermediate portion of the permanent magnet slot being arranged to protrude towards a side where a shaft hole of the rotor body is disposed;
a permanent magnet arranged in the permanent magnet slot, the permanent magnet comprising a plurality of permanent magnet segments, and partial lengths of the permanent magnet segments gradually decreasing outwards along a radial direction of the rotor body;
the permanent magnet slot comprises an inner layer permanent magnet slot and an outer layer permanent magnet slot; the inner layer permanent magnet slot and the outer layer permanent magnet slot are arranged and spaced outwards along the radial direction of the rotor body; the permanent magnet comprises an inner layer permanent magnet and an outer layer permanent magnet; the inner layer permanent magnet is arranged in the inner layer permanent magnet slot; the outer layer permanent magnet is arranged in the outer layer permanent magnet slot; and the inner layer permanent magnet and the outer layer permanent magnet each comprise a plurality of permanent magnet segments;
the plurality of the permanent magnet segments arranged in the inner layer permanent magnet slot comprises a curved permanent magnet segment; the curved permanent magnet segment is arranged in an intermediate portion of the inner layer permanent magnet slot; and a curved portion of the curved permanent magnet segment is arranged to protrude towards the side where the shaft hole side is disposed; the plurality of the permanent magnet segments further comprises a plurality of first inner permanent magnet component segments arranged in a slot arranged between a first end of the curved permanent magnet segment and a first end of the inner layer permanent magnet slot; the plurality of the permanent magnet segments further comprise a plurality of second inner permanent magnet component segments disposed in a slot arranged between a second end of the curved permanent magnet segment and a second end of the inner layer permanent magnet slot; and a number of the plurality of the first inner permanent magnet component segments is greater than a number of the permanent magnet segments arranged in the first segment of the outer layer permanent magnet slot, and a number of the plurality of the second inner permanent magnet component segments is greater than a number of the permanent magnet segments arranged in the second segment of the outer layer permanent magnet slot.

13. The rotor structure according to claim 12, wherein a first magnetic barrier bridge is disposed between the first end of the curved permanent magnet segment and an adjacent first inner permanent magnet component segment thereof, and a second magnetic barrier bridge is disposed between the second end of the curved permanent magnet segment and an adjacent second inner permanent magnet component segment thereof.

14. The rotor structure according to claim 12, wherein lengths of the plurality of first inner permanent magnet component segments along the radial direction of the rotor body decrease outwards, and lengths of the plurality of the second inner permanent magnet component segments along the radial direction of the rotor body decrease outwards.

15. The rotor structure according to claim 12, wherein, a first magnetic barrier bridge is disposed between the first end of the curved permanent magnet segment and an adjacent first inner permanent magnet component segment thereof, or a second magnetic barrier bridge is disposed between the second end of the curved permanent magnet segment and an adjacent second inner permanent magnet component segment thereof.

16. A rotor structure, comprising:
a rotor body provided with a permanent magnet slot group, the permanent magnet slot group comprising a permanent magnet slot, a first segment and a second segment of the permanent magnet slot being arranged to extend towards an outer edge of the rotor body, and an intermediate portion of the permanent magnet slot being arranged to protrude towards a side where a shaft hole of the rotor body is disposed;
a permanent magnet arranged in the permanent magnet slot, the permanent magnet comprising a plurality of permanent magnet segments, and partial lengths of the permanent magnet segments gradually decreasing outwards along a radial direction of the rotor body;
the permanent magnet slot comprises an inner layer permanent magnet slot and an outer layer permanent magnet slot; the inner layer permanent magnet slot and the outer layer permanent magnet slot are arranged and spaced outwards along the radial direction of the rotor body; the permanent magnet comprises an inner layer permanent magnet and an outer layer permanent magnet; the inner layer permanent magnet is arranged in the inner layer permanent magnet slot; the outer layer permanent magnet is arranged in the outer layer permanent magnet slot; and the inner layer permanent magnet and the outer layer permanent magnet each comprise a plurality of permanent magnet segments;
the plurality of the permanent magnet segments comprise a first outer component segment, a second outer component segment, a third outer component segment, a fourth outer component segment, a fifth outer component segment and a sixth outer component segment;
lengths of the first outer component segment, the second outer component segment and the third outer component segment along the radial direction of the rotor body decrease sequentially, or lengths of the fourth outer component segment, the fifth outer component segment and the sixth outer component segment along the radial direction of the rotor body decrease sequentially.

17. A rotor structure, comprising:
a rotor body provided with a permanent magnet slot group, the permanent magnet slot group comprising a permanent magnet slot, a first segment and a second segment of the permanent magnet slot being arranged to extend towards an outer edge of the rotor body, and an intermediate portion of the permanent magnet slot being arranged to protrude towards a side where a shaft hole of the rotor body is disposed;
a permanent magnet arranged in the permanent magnet slot, the permanent magnet comprising a plurality of permanent magnet segments, and partial lengths of the permanent magnet segments gradually decreasing outwards along a radial direction of the rotor body;
the permanent magnet slot comprises an inner layer permanent magnet slot and an outer layer permanent magnet slot; the inner layer permanent magnet slot and the outer layer permanent magnet slot are arranged and spaced outwards along the radial direction of the rotor body; the permanent magnet comprises an inner layer permanent magnet and an outer layer permanent magnet; the inner layer permanent magnet is arranged in the inner layer permanent magnet slot; the outer layer permanent magnet is arranged in the outer layer permanent magnet slot; and the inner layer permanent magnet and the outer layer permanent magnet each comprise a plurality of permanent magnet segments;
the plurality of the permanent magnet segments arranged in the inner layer permanent magnet slot comprises a curved permanent magnet segment; the curved permanent magnet segment is arranged in an intermediate portion of the inner layer permanent magnet slot; and a curved portion of the curved permanent magnet segment is arranged to protrude towards the side where the shaft hole side is disposed; the plurality of the permanent magnet segments further comprises a plurality of first inner permanent magnet component segments arranged in a slot arranged between a first end of the curved permanent magnet segment and a first end of the inner layer permanent magnet slot; the plurality of the permanent magnet segments further comprise a plurality of second inner permanent magnet component segments disposed in a slot arranged between a second end of the curved permanent magnet segment and a second end of the inner layer permanent magnet slot; and a number of the plurality of the first inner permanent magnet component segments is greater than a number of the permanent magnet segments arranged in the first segment of the outer layer permanent magnet slot, or a number of the plurality of the second inner permanent magnet component segments is greater than a number of the permanent magnet segments arranged in the second segment of the outer layer permanent magnet slot.

\* \* \* \* \*

UNITED STATES PATENT AND TRADEMARK OFFICE
CERTIFICATE OF CORRECTION

PATENT NO. : 11,695,305 B2  
APPLICATION NO. : 17/048069  
DATED : July 4, 2023  
INVENTOR(S) : Yusheng Hu et al.

Page 1 of 1

It is certified that error appears in the above-identified patent and that said Letters Patent is hereby corrected as shown below:

In the Claims

In Column 9, Line 26, replace "radial directions" with --radial direction--.

In Column 9, Line 28, replace "an outer later" with --an outer layer--.

In Column 9, Line 45, replace "length of a" with --a length of a--.

Signed and Sealed this  
Twenty-fourth Day of October, 2023

Katherine Kelly Vidal  
*Director of the United States Patent and Trademark Office*